(12) United States Patent
Matvienko et al.

(10) Patent No.: US 9,767,682 B2
(45) Date of Patent: Sep. 19, 2017

(54) REMOTE CONTROL UNIT AND A METHOD FOR CONTROLLING ELECTRIC DEVICES BY USING SUCH A REMOTE CONTROL UNIT

(71) Applicant: SPB TV AG, Zug (CH)

(72) Inventors: Dmitry Nikolaevich Matvienko, Omsk (RU); Nikolay Viktorovitch Krasko, Saint-Petersburg (RU)

(73) Assignee: SPB TV AG, Zug (CH)

( * ) Notice: Subject to any disclaimer, the term of this patent is extended or adjusted under 35 U.S.C. 154(b) by 0 days.

(21) Appl. No.: 15/006,598

(22) Filed: Jan. 26, 2016

(65) Prior Publication Data

US 2017/0213448 A1    Jul. 27, 2017

(51) Int. Cl.
  *G05B 11/01*        (2006.01)
  *G08C 17/02*        (2006.01)
  *H04L 29/08*        (2006.01)

(52) U.S. Cl.
  CPC ............ *G08C 17/02* (2013.01); *H04L 67/125* (2013.01); *H04L 67/26* (2013.01); *G08C 2201/20* (2013.01); *G08C 2201/42* (2013.01); *G08C 2201/92* (2013.01); *G08C 2201/93* (2013.01)

(58) Field of Classification Search
  CPC ...................................... G08C 17/02
  USPC ...................................... 340/12.25
  See application file for complete search history.

(56) References Cited

U.S. PATENT DOCUMENTS

| | | | | |
|---|---|---|---|---|
| 2004/0070491 | A1* | 4/2004 | Huang | G08C 17/02 340/10.5 |
| 2005/0188052 | A1* | 8/2005 | Ewanchuk | H04L 12/5695 709/217 |
| 2010/0031292 | A1* | 2/2010 | Bakker | H04H 60/31 725/43 |
| 2012/0084381 | A1* | 4/2012 | Alladi | G06F 9/544 709/213 |
| 2013/0208135 | A1* | 8/2013 | Han | G06F 3/017 348/211.9 |
| 2014/0081465 | A1* | 3/2014 | Wang | G05B 13/02 700/276 |
| 2015/0371532 | A1* | 12/2015 | e Silva | H04N 21/475 340/12.28 |
| 2016/0104371 | A1* | 4/2016 | Selfe | G08C 17/02 340/4.32 |

(Continued)

*Primary Examiner* — Santiago Garcia
(74) *Attorney, Agent, or Firm* — Birch, Stewart, Kolasch & Birch, LLP (57) ABSTRACT

A method and system for controlling an electric device via a remote control panel comprises providing a network server that includes a database reflecting user preferences and statistics of usage of the device by the respective users; providing an application proxy on the device which is capable of controlling the device; providing the panel with controls configured to highlight the relevant control function; and associating at least one user with at least one relevant control. When a control is operated by a user, the panel operates in a mode associated with the profile of the user and with the pressed control. Usage statistics accumulated on the server is assessed by the server. An event that indicates the need for making a certain action to control the device by a certain user results in sending, by the server, a PUSH-notification containing information on the user who should exercise control and on the required control to the device.

16 Claims, 4 Drawing Sheets

(56) References Cited

U.S. PATENT DOCUMENTS

2016/0232114 A1* 8/2016 Lo ................. G06F 13/4068
2016/0307439 A1* 10/2016 Selfe ............... G08C 17/02
2016/0366348 A1* 12/2016 Dixon .............. H04N 5/33

* cited by examiner

REMOTE CONTROL UNIT AND A METHOD FOR CONTROLLING ELECTRIC DEVICES BY USING SUCH A REMOTE CONTROL UNIT

FIELD OF INVENTION

The present invention is generally related to a remote control panel, by means of which different users can control different devices, especially digital television playback devices. More specifically, the invention is related to a remote control panel that is capable of adapting to demands of different users and ensures the possibility of controlling devices using minimum number of touches on controls without exciting a conflict with the settings made by other users of the same panel.

In addition, the invention is related to a method for controlling electrical devices by means of the said panel.

BACKGROUND OF THE INVENTION

Many of the modern domestic electric appliances as well as some special devices are operated by remote control panels (hereinafter—a RC panel). This is especially related to the modern TV receivers or television signal playback devices (in particular, OTT or IPTV digital signals), operating of which without a RC panel is difficult to imagine. Obviously, as the number of electric appliances employed by a user increases, the problem of control becomes more complicated, since each device is generally provided with its own panel, so it is easy to lose these panels or mistake one for another. In this regard, there is a need for designing a single RC panel, which is capable of controlling different devices including those intended for different purposes.

Another problem inherent in the known RC panels is related to the fact that people who share a certain common device, for example, members of one family or employees of one company give different preferences to the settings of this device. Therefore, they find themselves in the situation of conflict as related to the use of this shared device, permanently readjusting the device for themselves and thus disrupting settings made by other users. As an example, different members of the same family are, as a rule, fans of absolutely different TV channels and programs. Men usually prefer sports channels and, accordingly, adjust a TV receiver in such a way that it is more convenient to call the content of a sports channel. Women are enthusiastic about TV series, children watch animated cartoons. Therefore, in order for a user to go ahead with viewing of the TV-content of interest for him/her, he/she often has to manipulate the RC panel for a long time, monitoring the content and selecting the desired channel and television program. The same can be true for air conditioners, radio receivers, kitchen machines and other devices.

Unfortunately, modern RC panels do not enable adaptation of an electric device to the preferences of several users simultaneously without sacrificing the settings made by each of these users. Accordingly, there is a need in the prior art for designing such a RC panel that would provide different users with the possibility of adapting related devices to the requirements of these users without loss of settings made by other users of these devices and this panel.

Further, let's turn attention to the following aspect. When controlling devices by means of a RC panel, a user is interested in generation of control input with minimum operating of the panel, ideally, by pressing only one button. This requirement can be easily observed if the RC panel has information about the user's preferences and as if anticipates his/her wishes. Meanwhile, currently known RC panels are prevented from adapting to the user's preferences based on the statistics of his/her behavior when handling the panel and controlled devices. Therefore, the prior art does not represent RC panels enabling the user to send the required control signal to the desired device by pressing only one button.

Finally, let's consider the aspect concerning the content provider, in particular, operators and advertisers. The content provider always seeks that the delivered information resources find their target audience as closely as possible. In this respect, the goals of subscribers, operators and advertisers coincide. The subscribers are provided with psychological comfort, if they are protected against TV-content, unneeded and uninteresting for them, while their TV-receiver is only tuned to playout favorite programs and channels. The situation when transmitted content is maximally focused is highly profitable for operators and advertisers. In this case, the broadcast program or advertisement will be delivered to the targeted audience and, as a consequence, will have maximum effect. Accordingly, operators and advertisers are very interested in the emergence of mechanism that enables identifying preferences of the TV content users. Such mechanisms are presented in the sphere of Internet technologies and delivery of digital TV content to personal devices. However, this problem has not been solved so far in the sphere of digital television playout on a big screen having several active users with different interests.

The prior art discloses RC panels that ensure the possibility of controlling several devices mated with them. Examples of such panels are disclosed in the US 20110217046, US 20100013695, and US 20040208588 documents. In addition, a multibrand RC panel that allows manipulating digital TV signal playback devices connected to the Internet network is known from US 20130205212. Unfortunately, the above drawbacks are inherent in all of these panels, therefore, there remains a need in this industry for a RC panel, by means of which different users can control different devices, which is capable of adapting to demands of different users and ensures the possibility of controlling devices using minimum number of touches on controls without exciting a conflict with the settings made by other users of the same panel.

SUMMARY OF THE INVENTION

The present invention allows coping with the drawbacks of the prior art by providing a new method for controlling electric devices using a new RC panel.

The claimed method comprises the following steps:

providing a network server that comprises a database containing data reflecting the user preferences towards the use of the said electric device, and the statistics of usage of this device by these users;

providing an application proxy on the controlled device, which is capable of taking control of this device upon receiving a relevant command from the panel, providing a panel comprising controls and visual indication means configured to highlight the relevant control with light of a certain property, associating at least one user with at least one relevant control, after which pressing one of the associated controls by the user places the panel in the mode of device control from the profile of the user associated with this pressed control, while the device usage statistics accumulated on the server is assessed by the server as concerning the user associated with this pressed control, detecting, by the server, an event that indicates the need for making a certain control action by a certain user, sending, by the server, a PUSH-notification containing information on the user who should exercise control and on the required control action to the controlled device, transferring the PUSH-notification, received from the server, by the device to the panel, highlighting the relevant control by the panel using light of a certain property, wherein the highlighted control corresponds to the user, information on which is contained in the PUSH-notification, and the said property of light corresponds to the type of the required control action, pressing the highlighted control on the panel by the user, transferring, by the panel to the controlled device, a command instructing the application proxy to take control of this device along with the indication of the control action to be executed, initiating, by the application proxy, control of the device that results in execution of the required control action by this device.

According to one embodiment of the provided method, a digital television playback device is operated by means of the panel.

According to another embodiment of the provided method, the method further comprises a step of setting up, by the server, a filter for the content to be sent to the digital television playback device for at least one definite user.

According to yet another embodiment of the provided method, the method further comprises a step of associating a user with a guest control, wherein statistics of the user associated with this guest control is ignored by the server when the guest control is pressed.

According to one embodiment of the provided method, the panel operates a group of electric devices, wherein the PUSH-notification sent by the server contains additional information on the device expecting a control action, and a certain property of light used at the step of highlighting a certain control by the panel further corresponds to the device expecting a control action.

therewith, in situation when two or more devices simultaneously require control action from the user associated with the same control, the method further comprises a step of selecting by the user, with the help of controls, a specific device to which the command for execution of the required control action will be transferred as a result of pressing the highlighted control by the user.

According to yet another embodiment of the provided method, the said panel also operates a device having a memory unit to record user preferences towards the usage of this device, wherein the server does not accumulate the device usage statistics and, correspondingly, a command instructing the application proxy to take control of this device, transferred by the panel, comprises a control action preset without the use of server, solely by relevant manipulating a control.

According to yet another embodiment of the provided method, the method employs a remote control panel being a virtual panel visualized on the sensor display of a personal computer device.

According to yet another embodiment of the provided method, the method further comprises a step of searching for the panel carried out by sending a relevant query to the panel by the server and/or by controlled device connected to the panel.

According to yet another embodiment of the provided method, the method further comprises a step during which the server, based on the signals received from the panel, analyses user tactile preferences towards manipulating controls, wherein information on the user tactile preferences is stored in the said database.

According to yet another embodiment of the provided method, the method further comprises a step during which the server compares the accumulated data on the preferences and/or statistics of the user associated with the currently pressed button of the user profile and the current data on the preferences and/or statistics of this user and, in case of considerable disagreement between these data, the method comprises a step of sending a notification with a proposal to check the current profile to the said user.

According to another aspect of this invention, it is related to the remote control panel which is designed to implement the above method and comprises:

a processor, a power supply unit, controls including a control element and at least one user profile button, wherein the said at least one user profile button can be associated with at least one relevant user, a transceiver having a radio frequency transmit-receive module configured to communicate with the electric device to be controlled, and visual indication means configured to highlight a certain control using light of a certain property in response to a command from the processor, wherein the processor is configured to analyze a PUSH-notification received by the transceiver during communication with the controlled device, and to issue a command to the visual indication means for highlighting a certain control using light of a certain property, and wherein the highlighted control corresponds to the user information on which is contained in the PUSH-notification, and the said property of light corresponds to the type of the required control action, wherein the panel is designed in such a way that pressing one of the user profile buttons places the panel in the mode of device control from the profile of the user associated with this pressed user profile button, while pressing the relevant control element at the instant when the relevant control is highlighted using light of a certain property results in sending to the device to be controlled a command instructing the application proxy to take control of this device along with the indication of the control action to be executed.

According to one embodiment of the claimed panel, the panel is designed to operate a digital television playback device.

According to another embodiment of the claimed panel, the panel is configured to control a group of electric devices, wherein the controls are configured to select a specific device to which, as a result of pressing the highlighted control by the user, a command to execute the required control action will be transferred.

According to yet another embodiment of the claimed panel, the panel additionally comprises a speaker and a vibrator.

According to yet another embodiment of the claimed panel, the speaker is configured to issue an audio signal upon receiving by the panel a query for searching the panel from the server and/or controlled device.

According to yet another embodiment of the claimed panel, its transceiver is additionally furnished with an IR module ensuring compatibility of this panel with devices having an IR port.

BRIEF DESCRIPTION OF DRAWINGS

The above and other advantages of the invention will be better understood from the following detailed description of its practical embodiments disclosed with reference to the accompanying drawings, in which.

DESCRIPTION OF A PRACTICAL EMBODIMENT

Before disclosure of a practical embodiment of the provided panel and the method of its usage, it should be noted that the advantages of the present invention over the prior art solutions reveal themselves in full if two following conditions are met.

According to the first condition, it is assumed that information on the users and their preferences towards the usage of controlled devices is generated, accumulated and stored on a specially designated network server placed, most preferably, in the Internet network. This a default situation for the current technology level, according to which users of personal devices including domestic ones prefer to store their data in cloud Internet storages that can be accessed from anywhere globally. The mentioned fact indicates that the devices controlled by the provided panel should have network extension to communicate with the server database containing data that reflect the user preferences regarding the use of the controlled devices, and the statistics of usage of these devices by the said users.

The second condition for implementation of this invention lies in the fact that the provided panel 1 should be configured to control electric devices via a client application proxy installed on the device to be controlled. Accordingly, the devices to be controlled should provide a means for installation of the said application proxy. Further, this installed application proxy should be capable of taking control of the device upon receiving a relevant command from the provided panel. In this regard, it is appropriate to mention that many modern devices such as smartphones, tablet computers and smart TV receivers, are provided, even at the stage of manufacture, by hardware and software environment allowing installation of such a client application proxy. It means that this condition is realizable for a large group of modern devices.

If hardware and software environment of any device does not provide a means for installation of application proxy on this device, the issue can be optionally solved due to connection of the said device to a special attachment unit capable of controlling this device and ensuring its communication with the panel and server using its own application proxy.

In the worst-case scenario, if the device cannot support, among other functions, connection to the said special attachment unit, the device according to the present invention can be controlled by an IR module in a mode that does not presume the device feedback with the panel. Naturally, when this is the case, the advantages of this invention becomes inaccessible, and the panel functions like a RC panel of the prior art devices.

Figure 1:
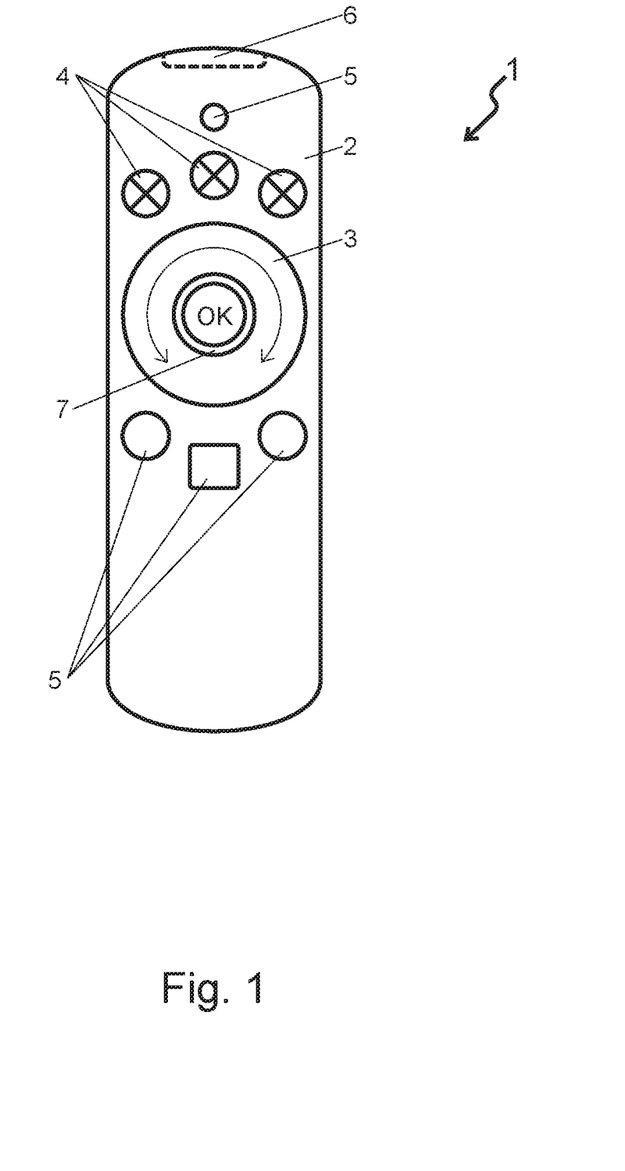
FIG. 1 illustrates a simplified appearance of the provided panel.

A possible appearance of the claimed panel designated by the general reference number 1 is shown in FIG. 1. The panel 1 comprises the housing 2 incorporating the transceiver 6, the main control element 3, the user profile buttons 4 and other control buttons 5.

By analogy with standard RC panels, the control element 3 is designed to navigate the available control options and to select and confirm the required option. It can be a joystick, a touchpad, a four- or five-position button, a rotary switch, a capacitive sensor with the central OK button (as is shown in the figure) and other suitable navigation and input means.

The user profile buttons 4 are used to associate the panel with different users and, in particular, to the server database records corresponding to these users. The illustrative example in FIG. 1 shows that the panel 1 comprises the user profile buttons 4 (according to the data obtained by the applicant as a result of focus-group polling, the number of active users of domestic devices in an average-sized family usually equals to three). However, it should be appreciated that the scope of the present invention is not limited by a specific number of the user profile buttons 4. Depending on the target group of panel users, the number of buttons can be either less or more than three. The buttons 4, which are disclosed below in more detail, present novelty of this invention.

The buttons 5, as a rule, facilitate the process of device operation by a user. For example, the buttons 5 can include a cancel button, a menu item quit button, a mute button or any other button intended to reduce user's action aimed at manipulating the panel 1. Further, the buttons 5 can comprise a button for selecting a specific device to be controlled. The exact number of buttons 5 is not limited by this invention. The control element 3 and the buttons 4, 5 jointly form the controls.

The transceiver 6 is designed to exchange signals between the panel and devices to be controlled. In particular, it is applied to transfer control actions from the panel to devices and to receive signals, formed by the server and intended to adapt the panel to preferences of specific users, by the panel. This is also described below in more detail.

Figure 2:
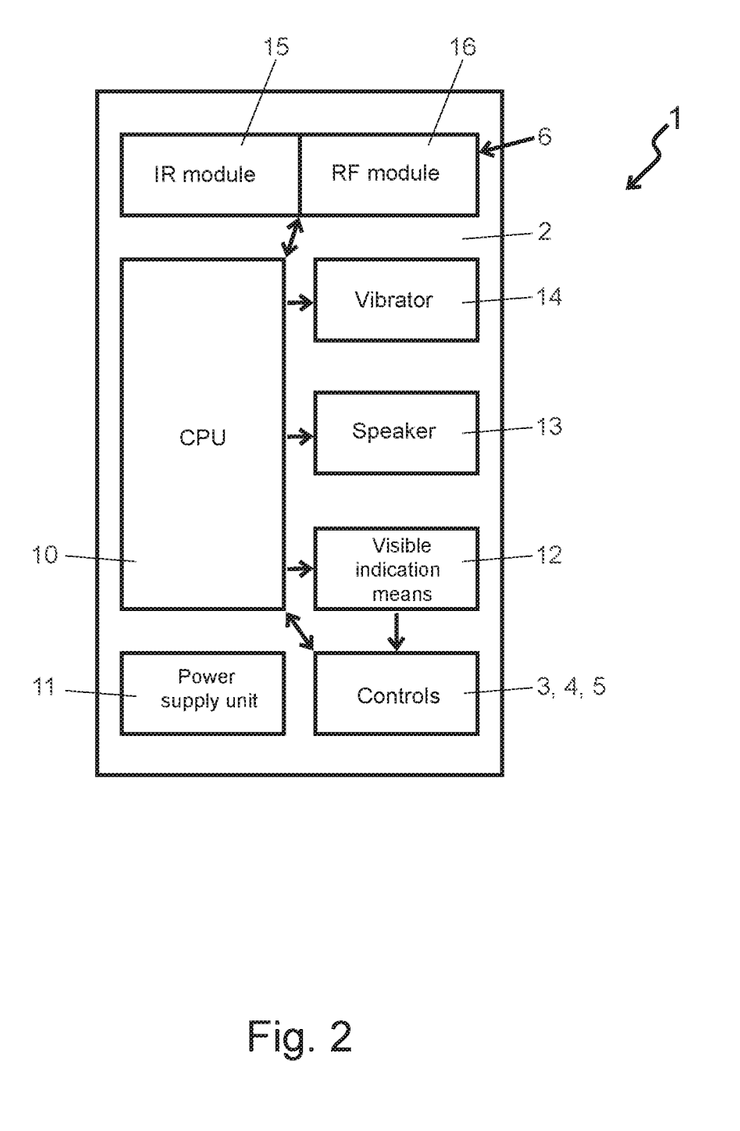
FIG. 2 shows a functional diagram of the provided panel.

FIG. 2 shows a functional diagram of the claimed panel 1. As shown in this figure, the panel comprises a processor 10, a power supply unit 11, visual indication means 12, a speaker 13, a vibrator 14, as well as the foregoing controls 3, 4, 5 and the transceiver 6.

The processor 10 ensures interaction between all panel components and exercises their control during all steps of manipulating the panel. The power supply unit 11, as the term suggests, is configured to supply power to the panel components. The visual indication means 12, the speaker 13, the vibrator 14 are designed to issue visual, acoustic and tactile signals, respectively, to the user's panel. Unlike the means 12, the speaker 13 and the vibrator 14 are optional and used, as a rule, to enhance an impression made on the user, and to create more realistic feedback sensations when manipulating the panel 1.

As for the visual indication means 12, their role for the present invention is substantial. It consists in sending visible notifications for one or more particular users to indicate the necessity of making one or more actions for control of one or more particular devices by these users. For this purpose, the visual indication means 12 are connected with the controls 3 and 4, in particular, with the user profile buttons 4 and the control element 3 and configured to highlight these controls 3 and 4 with light of certain properties allowing different users to recognize visually, for who of them the sent notification is intended and what type of control is expected by the controlled device from the users. The said variable highlighting properties can include color, brightness and flickering frequency. Meanwhile, it should be appreciated that the most preferable highlighting property is color, since it is best perceived by a typical individual. Therewith, each highlight color should correspond to a certain control action. The correspondence between highlight colors and control actions may be specified by a user based on his/her preferences. It should also be noted that the means 12 can be implemented in a different manner, for example, in the form of light diodes, liquid-crystal displays and other light-emitting elements.

In the illustrative example shown in FIG. 1, the visual indication means 12 are configured to highlight the annular field 7 of the control element 3 with different colors while highlighting the user profile buttons 4 with white color. According to this embodiment of the invention, highlighting a certain user profile button 4 with white color points out that information displayed by the panel is intended for the user associated with this highlighted button 4. Meanwhile, simultaneous highlighting the annular field 7 of the control element 3 with a certain color informs the user about the type of control action that will be directed at respective controlled device as a result of pressing the control element 3 by the user. Obviously, information on the type of expected control action is contained in the color of the annular field 7. Let us assume that blue highlight color informs the user that the device to be controlled has stored the program, for which the user is subscribed, in its memory in the users absence. Consequently, if the user presses the control element 3 at the moment when its annular field 7 is highlighted with blue color, a command will arrive at the controlled device that instructs this device to start playback of the stored program for the user associated with the highlighted button 4.

Also, it should be obvious that visible notifications can arrive at the panel for several users simultaneously and, as this takes place, they can refer to different control actions. For example, the control element 3 and the first user profile button 4 are initially highlighted at the panel with a certain color thus informing the user that this controlled device is expecting a certain control action from this user. Then, the control element 3 and the second user profile button 4 are highlighted. As a consequence, information about expectation of a certain control action is transferred to the second user, etc. If several notifications of control signals expected by controlled devices are delivered to one user at the same time, the respective information is displayed for this user by highlighting the corresponding button 4 along with alternate simultaneous highlighting of the control element 3 annular field 7 with all colors related to the desired control actions. Therewith, pressing the control element 3 by the user will result in transfer of the control action, which corresponded to the field 7 highlight color at the moment of pressing, to the controlled device.

As follows from all that has been previously said about the visual indication means 12, each user profile button 4 is configured to be associated with the respective user of the panel. The associating process can proceed, for example, while a user is being logged in the server database with involvement of the user interface of application proxy installed on the controlled device. To do this, each user shall access the server via network to inform the server about his/her account name, sign-on password and mobile number as an additional measure for protection of his/her personal data. In response, the server shall create a relevant user account in the database and invite the user to complete logging-in by introducing a confirmation code preliminarily sent by the server to the user's mobile phone. Simultaneously, the server can invite the user to select a certain user profile button 4 for himself/herself. Information on user binding to a certain button 4 shall be stored in the server database. Subsequently, the user can change his/her settings including binding to a certain user profile button 4 with the help of the server.

As follows from FIG. 2, the transceiver 6 consists of two modules, the infrared radiation module 15 (hereinafter—the IR module) and the radio frequency transmit-receive module 16. The IR module is optional. It is designed to interface the provided panel with devices that cannot interact with the panel by means of radio frequency signals, in particular, with legacy TV receivers suitable for receiving IR control signals. The function of the radio frequency transmit-receive module 16 is essential for the present invention. It is just the module 16 that enables transmitting control signals to the controlled devices in the radio frequency range and is capable of receiving feedback signals, which allow adaption of the provided panel 1 to the requirements of specific users, from controlled devices. At the time of writing this application, Bluetooth version 4.X is the most preferable standard for the radio frequency transmit-receive module 16, however, note that a particular type of the radio frequency transmit-receive module 16 should not be considered as limiting the scope of the present invention.

At the initial stage of panel usage, it is desirable that users directly indicate special features preferable for them when using the device to be controlled. Thus, in case of a TV receiver, a user can point out the programs and channels of primary interest for him/her in the appropriate database fields via the application proxy interface. Naturally, the user is free to give such instructions at any time when using a device as the need arises. The preferences designated by the user himself/herself shall be assigned the maximum likelihood factor.

Subsequently, as the device is operated by means of the provided panel, the server will accumulate the history of user's behavior in the database, reveal and predict his/her preferences. Let us resort again to the TV receiver example. Let us assume that a user associated with the first user profile button 4 turns on a TV receiver to watch games of the Arsenal football squad. The server analyzes and records these statistics. A mark indicating that Arsenal football games are of potential interest for this user is made in the relevant field of user preferences. Statistics for other panel users associated with other user profile buttons 4 are accumulated in a similar fashion. The preferences established on the basis of accumulated statistics of user behavior are assigned the average likelihood factor. It should be also noted that the systems for collection and analysis of user action statistics when using media resources are widely represented in the art. As an example, the E-Contenta system of personal content recommendations for media-applications can be mentioned.

Thus, the server employed together with the claimed panel is capable of "anticipating" the consumers' wishes relating to the possible use of devices controlled by the provided panel. Furthermore, even if a user has not indicated his/her preferences explicitly and has not accumulated sufficient device usage statistics so far, the server can try to assess potential preferences of the user in this case as well. In this situation, the server is guided by information on the region from which the user enters the net and by the user personal data (such as sex, age, marital status, etc.), if the user has specified these data during panel registration. Finally, if the user is logged in the database using his/her account in any of social networks, the server can handle, among others, data taken from this social network to assess the user preferences. It will be understood that in this situation the server can obtain much more meaningful, though not very reliable data on the user potential preferences. The user preferences determined on the basis of indirect data on him/her are assigned the minimum likelihood factor.

Meanwhile, the functions of the server employed together with the provided panel are not limited by collection and analysis of data on preferences of the users of the claimed panel. According to another important aspect of this server, it can form and send to the panel 1 a PUSH-notification, similar in the functional principle to PUSH-notifications employed in network technologies for delivery of messages generated on the initiative of the supplying party. This PUSH-notification is compiled by the server, first, based on information on the user preferences towards the usage of controlled device, both explicitly designated by the user himself/herself and predicted by the server based on the knowledge about this user. Second, this notification is compiled on the basis of data on occurrence of event being potentially essential for the user, which, according to the server's prediction, can force the user to start operating the device by means of the claimed panel. In other words, this PUSH-notification is intended to draw user's attention to approach of a certain event presuming execution of some actions for operating any panel-controlled device by the user. Accordingly, the PUSH-notification sent to the provided panel generally contains information on the device expecting a control action, the user who should execute the said control action and the desired control action for the said user and device.

Since the panel 1 is not connected with server 20 directly, the PUSH-notification is transmitted to the panel 1 in transit through an application proxy on one of the controlled devices, as a rule, through the device currently connected with the panel 1. Thus, at first, the PUSH-notification is sent by the server 20 to the network-connected device to be controlled, following which this device issues the notification to the panel 1 via its radio frequency transmit-receive module 16. It should be noted that the controlled device that transmits the PUSH-notification can be inactive and remain in the Standby mode.

Further, the fact of receiving the PUSH-notification by the panel is displayed for the user by above-mentioned highlighting of the respective controls, i. e. a pair including the control element 3 and a certain user profile button 4. After this, it only remains for the user associated with this button 4 to press it or the control element 3, and the panel will automatically transmit the desired control action to the required device. In case of a TV receiver, this PUSH-notification can inform the user, for example, on the forthcoming beginning of the football game of interest. In case of an air conditioner, it can be information on decrease of room temperature below a threshold value, etc.

Figure 3:
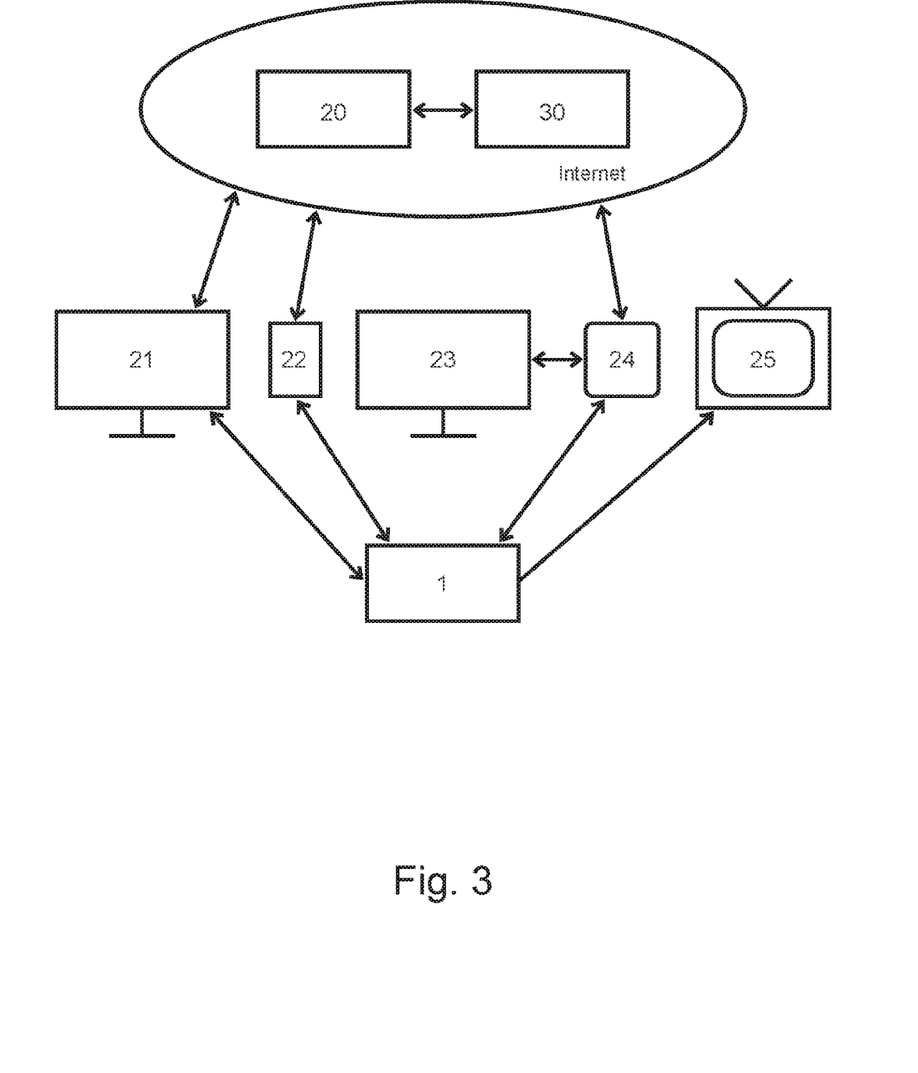
FIG. 3 illustrates the provided method for controlling digital television playback devices by means of the provided panel.

Referring now to FIG. 3, we consider example use of the claimed panel 1 for the case of controlling the video content playback devices 21, 22, 23, 25. This is the most relevant example since, according to statistics, RC panels are mostly used to control various TV and video content playback devices.

The presented example involves the server 20 comprising a customer database, which is placed in the Internet network and configured to interact with the media platform 30 being a video content repository. Such media platforms are widely represented in the Internet network. As one example, SPB TV Media Platform can be mentioned. Access to the content of the media platform 30 can be provided both free of charge and on a fee basis. In the latter case, the user will have to pay for the entry. In a number of instances, the server 20 and the media platform 30 can be implemented as a unified entity.

Let us assume that, among video content playback devices shown in FIG. 3, only the devices 21 and 22 comprise an installed client application proxy, which is capable of taking comprehensive control of these devices 21 and 22 to implement their nominal functions. Furthermore, this application proxy provides communication of these devices 21 and 22 with the server 20 and the panel 1. The said devices 21 and 22 can be, for example, a TV receiver provided with access to the Internet, a notebook, a smartphone, a tablet computer, etc. The required application proxy can be installed on the devices 21 and 22, for example, by the manufacturer of these devices. Otherwise, the user can install the required application by himself/herself, using standard tools of the respective software and hardware platform of the devices 21 and 22 ("app store") or software developed by the panel provider or by third parties.

Now, let us assume that the device 23, due to special features of its hardware and software, does not provide the possibility of accommodating the required application proxy. However, it is capable of taking control from the special attachment unit 24 provided with a relevant client application proxy. In some cases, another video content playback device 22, in particular, a smartphone can be used as the attachment unit 24 subject to the availability of appropriate software on this device.

In case of bundling the devices 23 and 24, it should be additionally noted that such configuration allows the panel 1 to control this pair of the devices 23 and 24 as a unit. For example, when a control action is sent to the attachment unit 24, the related device 23 will be activated automatically. In order to proceed to viewing of content, a user does not need to control each device of the pair 23-24 separately. Thus, the one button pressing concept continues to be relevant for this case as well.

As for the device 25, let us assume for completeness of example that it is presented by a legacy TV receiver, which is characterized in that it receives on-air signals, has no opportunity for interacting either with the server 20 or with the radio frequency transmit-receive module 16 of the panel 1, and cannot be controlled by an application proxy either directly or by means of the special attachment unit 24.

According to the example under consideration, a family of two, or, conventionally speaking, user No. 1 and user No. 2 have purchased the provided panel. User No. 1 has associated himself/herself with the first user profile button 4 and directly indicated in the database that "The dogs and cats" program of the Animal Planet TV-channel is the object of his/her interest. User No. 1 means to watch TV content on the devices 21, 22, 23.

User No. 2 has associated himself/herself with the second user profile button 4 and means to watch TV content on the devices 21, 25. User No. 2 did not inform the server about his/her preferences. Meanwhile, every time the user associated with the second user profile button 4 accesses the server 20 for video content by means of the panel 1, his/her request relates to viewing either regional news or the "Office" TV series. Obviously, the preference statistics of user No. 2 is accumulated on the server 20 only if it is used for TV viewing by the device 21, since the device 25, as mentioned above, lacks an installed client application proxy and cannot interact with the server 20.

Both users have agreed that red highlight of the element 3 means that a program of interest for a user will start within half an hour. Blue highlight indicates that a program of interest has finished in the user's absence, i. e. with a de-energized TV content playback device, however, the device has stored this program in its memory, or the program has been stored by the server and is accessible for call.

Thus, if the server 20, by means of periodic monitoring of TV content provided by the media platform 30, has discovered that "The dogs and cats" program broadcasting will start in a short time, it sends a relevant PUSH-notification through the device 21 to the panel 1. This PUSH-notification contains, first, information that it is intended for user No. 1 and, second, a location indicator of the resource that comprises the content with "The dogs and cats" program.

Having received the PUSH-notification by means of the radio frequency transmit-receive module 16, the panel 1 analyzes it with the use of the processor 10. According to the analysis results, the processor 10 instructs the visual indication means 12 to highlight the relevant user profile button 4 (in this case, the first button 4) with white color and to highlight the control element 3 with red color. In a number of instances, highlighting can be accompanied by issuing relevant audio and/or tactile signals. As a consequence, user No. 1 receives an indication that a program of interest for him/her will start soon even with inactive video content playback devices 21, 22, 23-24. In order to start "The dogs and cats" program viewing, he/she only needs to press the highlighted control element 3 (or the highlighted button 4, depending on the embodiment of the invention). The panel 1 will automatically send an appropriate command for the application proxy installed on the controlled device. The application proxy will energize the TV content playback device and, based on the URL address in the received PUSH-notification, start control of this device to display the content needed to the user and selected from the whole variety of content provided by the media platform 30. Accordingly, user No. 1 will not have to monitor video content pages, so he/she will be able to start viewing the program of interest by pressing just one button on the panel 1.

Binding the panel to a certain signal playback device or to a group of such devices can be specified by hardware, for example, with the use of a respective button 5 on the panel. If user No. 1 has selected the device 21 as the basic TV signal playback device, the panel will access the application proxy installed just on the device 21 by default.

All that has been previously said about user No. 1 is equally applicable to user No. 2. If the server 20, by means of periodic monitoring of TV content provided by the media platform 30, has discovered that regional news broadcasting will start in a short time, it sends a relevant PUSH-notification through the device 21 to the panel 1. This PUSH-notification contains, first, information that it is intended for user No. 2 and, second, a location indicator of the resource that comprises the content with regional news.

As mentioned above, if several visible notifications being relevant within the same time interval arrive at the panel simultaneously, the panel will display these visible notifications alternately. In the context of our example, first, a pair of controls 3 and 4 for user No. 1 and, second, a pair of controls 3 and 4 for user No. 2 will light up on the panel 1. To elaborate, the first user profile button 4 is initially highlighted with white color, which is accompanied by simultaneous highlighting of the control element 3 with red color on the panel 1. This means that the device 21 associated with user No. 1 is expecting a control action to initiate demonstrating of "The dogs and cats" program. Then, the second user profile button 4 is initially highlighted with white color, which is accompanied by simultaneous highlighting of the control element 3 with red color on the panel 1. This means that the device associated with user No. 2, i. e. the device 21 again, is expecting a control action to initiate demonstrating of the regional news.

If user No. 2 did not manage to turn on the TV content playback device in time and missed a regional news broadcast, this news broadcast will be stored on the server or recorded in the memory of the device 21, while highlight color of the control element 3 in the control element—second button 4 pair will be changed for blue one. Further, if a notification about the upcoming broadcasting of the next episode of the "Office" TV series (displayed with red color) is delivered to user No. 2 while another notification about the possibility of viewing the recorded regional news (displayed with blue color) is being issued to the same user, information about these two events will be provided to user No. 2 by highlighting the corresponding button 4 with white color along with simultaneous alternate highlighting of the control element 3 annular field 7 with blue and red colors. Therewith, it should be appreciated that the claimed panel 1 can combine issue of various type notifications to user No. 2 with issue of various type notifications to user No. 1 and any other users.

As a result, a short glance at the panel with one or more buttons highlighted is sufficient for any of all users associated with the panel to determine unambiguously based on highlights of the elements 3 and 4, whether the arrived visible notification is intended for him/her and what type of control action corresponds to this notification.

If however user No. 2 employs the provided panel 1 to view programs on the device 25 (i.e. on the device that is not provided with an application proxy and is incapable of interacting with the network server 20 and the transmit-receive module 16 of the panel 1), the device 25 will be controlled in compliance with the prior art. In this case, the panel 1 is unable to handle data on the preferences of user No. 2 and, correspondingly, to form and transmit a personalized control action to the device 25. Consequently, the advantages of this invention with respect to the device 25 are not achieved and, when manipulating the device 25, user No. 2 will have to act in a conventional manner, i. e. to select the content of interest manually by monitoring channels and programs broadcast by the device 25 and transfer control actions to the device 25 by means of the IR module 15. In that situation, user No. 2 has to involve the control element 3 to a far greater extent, since it is just this element of the RC panel that deals with navigating the available control options and with selecting and confirming the required option.

If one of the users associated with the panel 1 is going to control any of the devices 21, 22, 24 in the normal mode, i. e. without receiving a prompting PUSH-notification from the server 20 by the panel 1, and, consequently, at the moment when none of the buttons 4 is highlighted, this user needs to press the corresponding user profile button 4 on the panel 1. Following this, the user will automatically enter the mode of controlling the device 21, 22, or 24 from his profile, i. e. the mode where the server understands that the commands to control the device 21, 22, or 24, issued through the panel 1, are given by the user associated with this pressed user profile button 4, and statistics on the use of the device 21, 22, or 24 accumulated by the server 20 is assessed by the latter as relating to the user associated with this activated button 4. In this case, the device 21, 22, or 24 are mainly controlled by means of the element 3. As this takes place, a command instructing the application proxy to take control of the device 21, 22, or 24, transmitted by the panel 1 to this device 21, 22, or 24, comprises a control action specified via relevant manipulating the control element 3. Even if the server 20 participates in forming of the said action, this only proceeds in a passive manner. In particular, its participation can reduce to providing a user with an instantiated control option list compiled on the basis of data on the preferences and statistics of the current user that are stored in the server. Meanwhile, it should be noted that the server 20 does not form or send a PUSH-notification in this operation mode of the panel 1. Possible control options for the current user and the device employed by him/her are most typically displayed in the application proxy interface on the screen of device itself.

Finally, if after user No. 1, user No. 3, for example, is going to interact with the panel, at first he/she should press the third user profile button 4 to transfer the panel and related devices to his/her control profile, and only after this, user No. 3 can issue commands to the control device 21, 22, or 24 by means of the panel 1. Otherwise, the server will continue to suppose that the panel 1 is still controlled by user No. 1.

Figure 4:
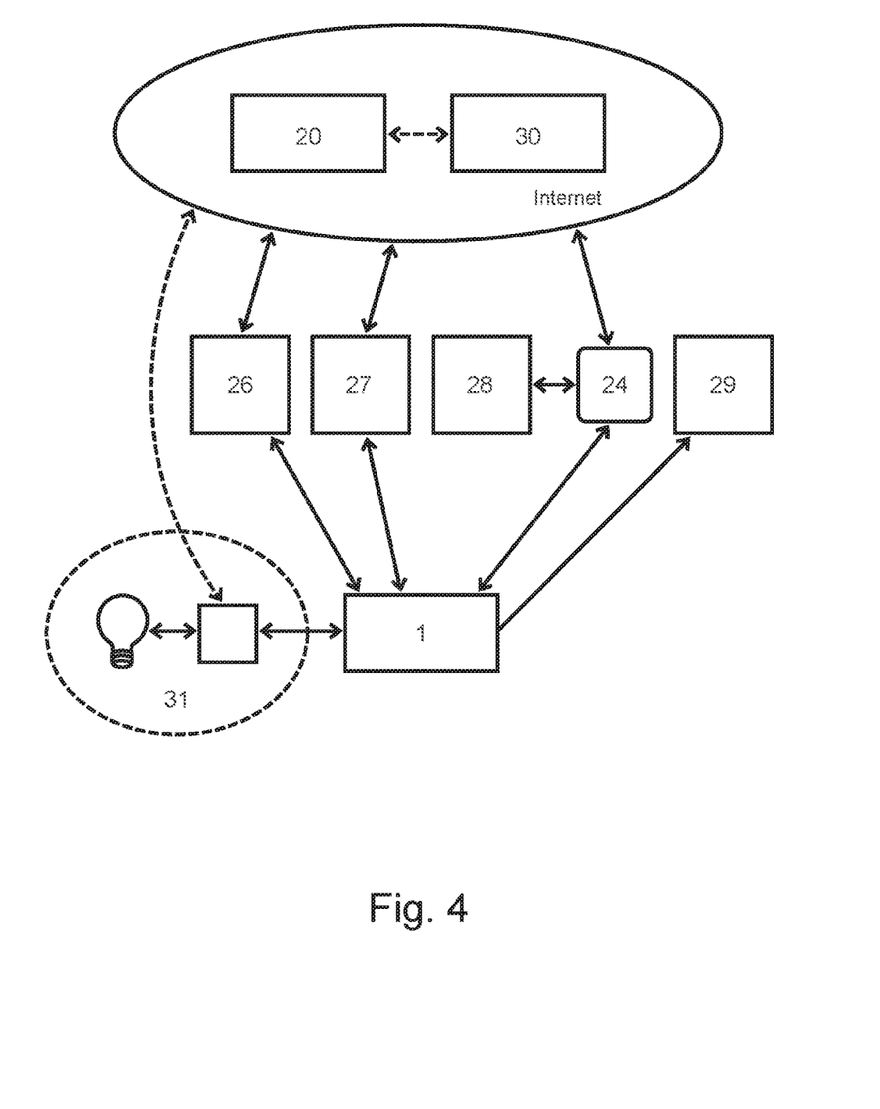
FIG. 4 illustrates the provided method for controlling electric devices intended for different purposes by means of the provided panel.

Referring now to FIG. 4, we consider example use of the claimed panel 1 for the general case, when control is exercised in respect to devices of different purpose. This embodiment of the invention is much like the embodiment shown in FIG. 3, therefore, further description is given in shorthand form, and components that coincide with the previous embodiment are not additionally explained.

Similarly to what was explained above with respect to FIG. 3, the reference numbers 26 and 27 in FIG. 4 relate to the controlled devices that are provided with the necessary client application proxy and can interact with the server 20. The device 28 does not provide the possibility of accommodating the required application proxy, however, it can take over control transferred by the special attachment unit 24 furnished by a client application proxy. The device 29 is characterized in that it has no opportunity for interacting either with the server 20 or with the radio frequency transmit-receive module 16 of the panel 1, and cannot be controlled by an application proxy either directly or by means of the special attachment unit 24. A special feature of the device 31, which is also provided with a client application proxy required for control, is that it has its own memory to record the user preferences towards the use of this device 31. As a consequence, the device 31 may be not connected with the network server 20. There is no need for this server, since all information required to control the device 31 can be obtained directly from its memory.

To be definite, let us assume that the device 26 is an air conditioner, the device 27 is a kitchen machine, the pair of devices 28, 24 is a TV receiver with a set-top box, the reference number 29 designates an electric tea kettle with an infrared port, and the reference number 31 designates a lighting control unit with connected smart lamps.

User No. 1 associated with the first user profile button 4 has indicated in the database of the server 20 that temperature of 22° C. is the most preferable room temperature for him/her. Furthermore, user No. 1 has recorded information indicating that 300 lux is the most preferable lighting for him/her in the memory of the device 31. User No. 2 associated with the second user profile button 4 did not inform the server 20 about his/her preferences towards the use of the devices 26 and 27. Meanwhile, user No. 2 starts the yogurt cooking program in the kitchen machine 27 using the panel 1 at 8:30 PM during many days. As for the settings and preferences of user No. 1 and user No. 2 that relate to TV content viewing on the devices 28-24, they are similar to those indicated earlier with reference to FIG. 3.

Both users have agreed that red highlight of the element 3 means that a program of interest for a user will start within half an hour. Yellow highlight indicates that the steady room temperature differs from 22° C. by more than 2° C. Orange highlight color of the element 3 refers to the actions that presume operating the kitchen machine 27. Purple highlight indicates that lighting in the room differs from 300 lux by more than 20 lux. Furthermore, a situation is possible when PUSH-notification transmitted to the panel is initiated by the operator of the server 20 and/or the media platform 30 and bears no direct relation to control of the devices 26, 27 and 28-24. Thus, the server operator can forward proposals to update software for the panel and application proxy or advertisement messages to a user. As a rule, such PUSH-notifications are automatically assigned a unique highlight color.

In view of the fact that the devices 26, 27 and 28-24 are connected to the server 20, the server gets the opportunity to analyze behavior of users with respect to the use of the devices 26, 27 and 28-24. In particular, this is the case of user No. 2. Accordingly, after a while, the server 20 will reveal the trend for the use of the kitchen machine 27 by user No. 2. Eventually, a certain period of time before 8:30 PM, the server 20 will send a relevant warning PUSH-notification through the device 27 to the panel 1. This PUSH-notification contains, first, information that it is intended for user No. 2, second, that it refers to the use of the kitchen machine 27, and third, it carries an instruction to start the yogurt cooking program in the kitchen machine 27.

Having received the PUSH-notification from the kitchen machine 27, the panel 1 highlights the second user profile button 4 with white color and simultaneously highlights the control element 3 with orange color. As a consequence, user No. 2 receives an indication that it is time to cook his/her evening yogurt. To initiate the cooking process provided that all the required ingredients are loaded into the kitchen machine 27, he/she only needs to press the highlighted control element 3. The panel 1 will automatically send an appropriate command for the application proxy installed on the controlled device 27. The application proxy will turn on the machine 27 and, based on the data contained in the PUSH-notification, start control of this device 27 for cooking yogurt.

By analogy with the example in FIG. 3, one or more PUSH-notifications arriving at the panel 1 for one user can be combined with one or more PUSH-notifications intended for other users. Let us assume that the controller of the device 31 has determined that intensity of lighting in the room has become too high or too low. Simultaneously, the server 20 has received information that "The dogs and cats" program broadcasting will start in a short time. As a consequence, the device 31 and the server 20 send relevant PUSH-notifications to the panel 1. In the first case, the PUSH-notification contains, first, information that it is intended for user No. 1, second, that it refers to the use of the lighting control unit 31 (purple highlight color), and third, it carries an instruction to start the lighting increase/decrease program or the curtain manipulating program on the device 31. In the second case, the PUSH-notification contains, first, information that it is intended for user No. 1, second, that it refers to the use of the attachment unit 24 connected to the device 28 (red highlight color) and third, it carries a location indicator of the resource that comprises the content with "The dogs and cats" program.

If several visible notifications that refer to different users and different devices but are relevant within the same time interval arrive at the panel simultaneously, the panel will display these visible notifications alternately. In the context of our example, the first user profile button 4 is initially highlighted with white color, which is accompanied by simultaneous highlighting of the control element 3 with purple color on the panel 1. This means that the lighting control unit 31 is expecting a control action from user No. 1. Then, the control element 3 on the panel 1 starts being highlighted with red color without changing highlight color of the first user profile button 4. This means that the device 28-24 is also expecting a control action from user No. 1. Finally, the second user profile button 4 is highlighted with white color, which is accompanied by simultaneous highlighting of the control element 3 with orange color on the panel 1. This means that the device 27 is expecting a control action from user No. 2. Then, highlighting continues in that order until users No. 1 and No. 2 execute the required action, or until the control action loses its relevance (for example, a TV program has finished or lighting of the room has come back to 300 lux).

Optionally, a user can be interested in unifying control of all available domestic and computer devices within the "smart home" program, when the user has the possibility of operating all devices by means of a single multibrand panel. In this regard, it should be appreciated that the claimed panel 1 can be also employed to control simple, non-computer devices that do not require special user settings, lack network extension and are essentially manipulated only by energizing and de-energizing. The electric tea kettle 29 is a typical example of such devices. The present invention leaves open the possibility of controlling such devices provided that they have a respective IR port. For this purpose, the panel is provided with the IR module 15 to ensure the conformance between the panel 1 and such devices 29. Note that this IR module 15 can be also employed with respect to a number of devices in emergency situations, namely, in order to transmit basic control actions to these devices at the moment when server connectivity has been lost for some reasons and/or a device does not receive control actions from the application proxy.

Thus, based on the examples presented in FIG. 3 and FIG. 4, it is seen that the RC panel and the method for controlling devices by means of this RC panel provided in this patent application can solve the problems at hand. In particular, owing to the invention provided, different users can control different devices by means of a single RC panel, which is capable of adapting to demands of different users and ensures the possibility of controlling devices using minimum number of touches on controls without exciting a conflict with the settings made by other users of the same panel.

Meanwhile, this invention can have some other special features which, though not being mandatory with regard to the main task of the invention, can lead to a number of useful advantages. The following can be referred to these special features.

If the panel 1 is used to view TV content in a family or group which includes children, a child's profile can be set for one or more users on the server 20. To do this, a panel user who has respective authority sets up a filter for the content to be issued to a certain user (for example, to a child associated with the third user profile button). As a result, issue of this content to the specified user will be disabled by the server, so the child will be secured against unacceptable information.

In addition to a child's profile, the provided panel 1 can provide a means for assigning a guest profile to a user. Such profile is suitable, for example, for people who use the panel 1 only once or occasionally and do not wait for receiving personal PUSH-notifications by the panel, and so, accumulation of statistics does not make sense for them. It should be appreciated that if such a guest user is going to use the provided panel to control the devices 21, 22, 23-24, 26, 27, he/she should be given an opportunity to control these devices in a correct manner. In the present invention, this opportunity has been implemented by associating a guest user with a guest profile button, for which one of the buttons 5 or an additional button 4 can be used, as an example. Then, with the pressed guest profile button 4, 5, statistics of the user associated with this button will be ignored by the server 20, while a command instructing the application proxy to take control of the device 21, 22, 23-24, 26, or 27, transmitted by the panel 1 to this device 21, 22, 23-24, 26, 27, will comprise a control action specified mainly via relevant manipulating the control element 3 by the guest user. Even if the server 20 participates in forming of the said action, this only proceeds in a passive manner. In particular, its participation can reduce to providing a guest user with a control option shortlist compiled, for example, on the basis of programs being most popular in a given region. Meanwhile, it should be noted that the server 20 does not form or send a PUSH-notification in this operation mode of the panel 1.

Many users are familiar with the situation when the panel has been lost and cannot be found by any means. For this occasion, the invention provides a panel searching procedure. In particular, it can be performed by sending a relevant query to the panel 1 through the server 20 and/or through the controlled device 21, 22, 24, 26, or 27 connected to the panel. As a result, after receiving a search query, the panel 1 starts emitting audio signals by means of the speaker 13. These signals enable the user to determine the panel location. The most typical source of search query is a user's mobile device capable of accessing the server and carrying an application proxy. As this takes place, the panel can be associated with any device of this user. A characteristic example is a search for the panel associated with a set-top box or Smart-TV from the mobile device.

Another advantage of the provided panel can consist in improving the ease of manipulating the controls 3, 4, 5 by a user, which is obtained through adaptation of the display speed of control options to the tactile special features of a particular user. For this purpose, the server 20 analyzes the tactile preferences of users towards manipulating the controls 3, 4, 5 based on signals received from the panel 1. Depending on the control type, these data can include the following parameters: a button pressing force, an angle and coordinates of user's finger position at different points of touch gesture, a length of finger movement trail, a speed of touch gesture, etc. Information of the tactile preferences of users is stored in the said database, for example, in the form of mathematical model of user behavior when manipulating controls. As a result, with the knowledge of user special features in respect to panel operation, the server or application proxy can display control options with the most convenient speed for a given user. Thus, the user feels more comfortable when operating the panel and graphical interface of application proxy.

Finally, note that knowing special behavior features of the users associated with the panel, the server 20 can identify the situation when the current user profile is used by a different user. To do so, the server can compare the accumulated data on the preferences and/or statistics of the user associated with the currently pressed button 4 of the user profile and the current data on the preferences and/or statistics of the active user and, in case of considerable disagreement between these data, the server can send a notification to the current user with a proposal to check his/her current profile.

The present invention has been disclosed above by the example of only several embodiments which should not be considered as conditions limiting scope of protection of the invention. The applicant considers it expedient to note that various amendments, supplements and modifications that do not result in a change of the chief matter of invention may be made to the disclosed embodiments and, consequently, all these amendments, supplements and modifications should be regarded as falling within the scope of invention defined by the appended claims.

LIST OF USED REFERENCES

1—RC panel
2—panel housing
3—control element
4—user profile buttons
5—other buttons
6—transceiver
7—annular field of control element (light indicator)
10—processor
11—power supply unit
12—visual indication means
13—speaker
14—vibrator
15—IR module
16—radio frequency transmit-receive module
20—server
21, 22—TV signal playback devices capable of providing direct interaction with the server
23—TV signal playback devices capable of providing interaction with the server only through a special attachment unit
24—attachment unit providing interaction with the server
25—TV signal playback devices incapable of providing interaction with the server in principle
26, 27—devices capable of providing direct interaction with the server
28—device capable of providing interaction with the server only through a special attachment unit
29—device incapable of providing interaction with the server in principle
30—media platform
31—device provided with memory for recording user preferences towards the use of this device

The invention claimed is:

1. A method for controlling an electric device by means of a remote control panel, the method comprising the following steps:
provide a network server that comprises a database containing data reflecting user preferences towards the use of the said electric device, and the statistics of usage of the device by the users;
providing an application proxy on the device, which is capable of controlling the device upon receiving a relevant command from the panel,
providing the panel with controls and an illuminated indicator configured to highlight the relevant control with light of a certain property,
associating at least one user with at least one relevant control, upon pressing one of the controls by the user placing the panel in the mode of device control from the profile of the user associated with the pressed control, assessing the device usage statistics accumulated on the server as concerning the user associated with the pressed control,
detecting via the server, an event that indicates the need for taking action to control the device by the user,
sending to the device, via the server, a PUSH-notification containing information on the user who should exercise control and on the required control action,
transferring the PUSH-notification, received from the server, by the device to the panel,
highlighting the relevant control by the panel using light of a certain property, wherein the highlighted control corresponds to the user, information on which is contained in the PUSH-notification, and the highlighted control element corresponds to the type of the required control action,
actuating the highlighted control on the panel,
transferring, by the panel to the device, a command instructing the application proxy to take control of the device along with the indication of the control action to be executed,
initiating, by the application proxy, control of the device that results in execution of the required control action by this device.

2. The method of claim 1, wherein the device is a digital television playback device and is operated by means of the panel.

3. The method of claim 2, further comprising a step of setting up via the server a filter for the content to be sent to the digital television playback device for at least one definite user.

4. The method of claim 2, further comprising a step of associating the user with a guest control element, wherein statistics of the user associated with the guest control element are ignored by the server when the guest control element is pressed.

5. The method of claim 1, wherein the panel operates a group of electric devices, wherein the PUSH-notification sent by the server contains additional information on the device to be controlled, and a certain property of light, used at the step of highlighting a certain control by the panel further corresponds to the device to be controlled,
wherein, in situation when two or more devices simultaneously require control action from the user associated with the same control, the method further comprises a step of selecting by the user, via the control, a specific device to which the command for execution of the required control action will be transferred as a result of pressing the highlighted control by the user.

6. The method of claim 5, further comprising operating, via the panel, a device furnished with a memory unit to record user preferences towards the usage of the device, wherein the server does not accumulate the usage statistics of the device and, correspondingly, a command instructing the application proxy to take control of the device, transferred by the panel, comprises a control action preset without the use of the server, solely by relevant manipulating the control element.

7. The method of claim 1, wherein the method is performed using a remote control panel comprising a virtual panel on a display of a personal computer device.

8. The method of claim 1, further comprising a step of searching for the panel by sending a query to the panel from one of the server and the controlled device connected to the panel.

9. The method of claim 1, further comprising a step during which the server, based on the signals received from the panel, analyses user tactile preferences towards manipulating the controls, wherein information on the tactile preferences is stored in the said database.

10. The method of claim 9, further comprising a step during which the server compares the accumulated data on the preferences and/or statistics of the user associated with the currently pressed button of the user profile and the current data on the preferences and/or statistics of the active user and, when there is disagreement between these data, the method further comprises a step of sending a notification to check the current profile to the said user.

11. A remote control panel designed to implement the method of claim 1, the panel comprising:
 a processor,
 a power supply unit,
 controls including a control element and at least one user profile button, wherein the said at least one user profile button can be associated with at least one relevant user,
 a transceiver having a radio frequency transmit-receive module configured to communicate with the electric device to be controlled,
 and visible indication means configured to highlight a certain control using light of a certain property in response to a command from the processor,
 wherein the processor is configured to analyze a PUSH-notification received by the transceiver during communication with the controlled device, and to issue a command to the visible indication means for highlighting a certain control using light of a certain property, and wherein the highlighted control corresponds to the user information which is contained in the PUSH-notification, and the said property of light corresponds to the type of the required control action,
 wherein the user profile buttons of the panel are configured such that pressing one of the user profile buttons places the panel in the mode of device control from the profile of the user associated with this pressed user profile button, while pressing the relevant control element when the relevant control is highlighted using light of a certain property results in sending to the device to be controlled a command instructing the application proxy to take control of the device along with an indication of the control action to be executed.

12. The panel of claim 11, wherein said panel is configured to operate a digital television playback device.

13. The panel of claim 11, wherein said panel is configured to control a group of electric devices, wherein the controls are configured to select a specific device to which, a command to execute the required control action will be transferred as a result of pressing the highlighted control.

14. The panel of claim 11, further comprising a speaker and a vibrator.

15. The panel of claim 14, wherein the speaker is configured to issue an audio signal upon receipt by the panel of a query for searching the panel from the server and/or controlled device.

16. The panel of claim 11, wherein the transceiver comprises an IR module for providing compatibility of the panel with devices having an IR port.

* * * * *